(12) United States Patent
Ballato et al.

(10) Patent No.: US 9,069,117 B1
(45) Date of Patent: Jun. 30, 2015

(54) HIGH PURITY CRYSTALLINE CORE OPTICAL FIBERS AND FORMATION METHODS THEREOF

(75) Inventors: John M. Ballato, Clemson, SC (US); Robert R. Rice, Simi Valley, CA (US)

(73) Assignee: CLEMSON UNIVERSITY, Clemson, SC (US)

( * ) Notice: Subject to any disclaimer, the term of this patent is extended or adjusted under 35 U.S.C. 154(b) by 426 days.

(21) Appl. No.: 13/446,525

(22) Filed: Apr. 13, 2012

Related U.S. Application Data

(60) Provisional application No. 61/475,374, filed on Apr. 14, 2011.

(51) Int. Cl.
*G02B 6/02* (2006.01)
*G02B 6/12* (2006.01)

(52) U.S. Cl.
CPC .. *G02B 6/02033* (2013.01); *G02B 2006/12035* (2013.01)

(58) Field of Classification Search
CPC .................. G02B 6/02033; G02B 2006/12035
USPC .................................. 385/123, 141, 142, 143
See application file for complete search history.

(56) References Cited

U.S. PATENT DOCUMENTS

| | | | |
|---|---|---|---|
| 6,947,208 B2 | 9/2005 | Ballato et al. | |
| 7,530,239 B2 | 5/2009 | Dutta | |
| 7,668,211 B1 | 2/2010 | Sudesh et al. | |
| 7,991,021 B2 | 8/2011 | Rice et al. | |
| 2010/0159242 A1* | 6/2010 | Bhagavatula et al. | 428/375 |
| 2011/0026880 A1* | 2/2011 | Galli et al. | 385/28 |
| 2011/0103756 A1 | 5/2011 | Rice et al. | |

* cited by examiner

*Primary Examiner* — Ryan Lepisto
(74) *Attorney, Agent, or Firm* — Dority & Manning, P.A.

(57) ABSTRACT

Disclosed is an optical fiber formed from a preform that includes a clad material and a core material. The clad material includes an oxide glass and the core material includes as a primary component a semiconductor material that melts at a temperature below where the cladding glass draws into fiber. In addition, the core material includes a scavenger for oxide precipitates that can precipitate into the core from the adjacent clad material during the fiber formation process. During formation, the scavenger reduces oxide precipitate to form the core primary component, or a phase compatible with it, and volatile products. The volatile products evolve out of the system. The primary material of the core can melt during the fiber formation process and crystallize upon cooling leaving the formed optical fiber with a crystalline core and little or no impurities due to precipitation of oxide into the core.

31 Claims, 11 Drawing Sheets

HIGH PURITY CRYSTALLINE CORE OPTICAL FIBERS AND FORMATION METHODS THEREOF

CROSS REFERENCE TO RELATED APPLICATION

This application claims filing benefit of U.S. Provisional Patent Application Ser. No. 61/475,374 having a filing date of Apr. 14, 2011, which is incorporated herein in its entirety by reference.

BACKGROUND

Typical optical fibers include a core material and a cladding material, with each of the core and the cladding usually being fabricated largely from fused silica and having dissimilar refractive indices. A fiber can be formed by drawing a preform, which is a large mass that includes the core and cladding materials arranged in a shape that can resemble a cross-section of the finished fiber, but is much larger. The preform can be drawn in a fiber drawing tower during which the preform is heated and stretched from one end to form the optical fiber. The finished fiber can have a length that can be constrained by a variety of factors, including physical and operational factors such as those resulting from Raman gain and/or pump power.

The core material of a typical optical fiber can exhibit optical gain through a phenomenon called stimulated Raman scattering (SRS) according to which optical signals are amplified as they propagate through the fiber. Amplification of optical signals via SRS is dependent on both a Raman gain coefficient of the core material and the length of the optical fiber. To achieve desired Raman gain coefficients, optical fiber cores are typically doped with additional materials to increase the optical gain of the fiber. However, such doping has limitations in contributing to a Raman gain coefficient. As a result, to achieve substantial amounts of optical amplification of a given optical signal, some optical fibers have to be fabricated at a length of hundreds of meters or more. Accordingly, some optical systems require a substantial amount of physical space and/or power to maximize optical signal intensity that is provided from an optical pump or laser.

SUMMARY

According to one embodiment, disclosed is a preform for forming an optical fiber. The preform includes a preform clad and a preform core. The preform clad includes an oxide glass and the preform core includes a primary core material and a scavenger for the oxide of the oxide glass. An optical fiber drawn from the preform is also disclosed. More specifically, the primary core material of the fiber is crystalline and the core includes less than about 15 at.% oxygen molecules.

Methods for forming an optical fiber are also disclosed. For example, a method can include forming a preform core and a preform clad. The preform core can include a primary core material and a scavenger for an oxide and the preform clad can include the oxide. The method can also include drawing the preform core and the preform clad together to form the optical fiber. The optical fiber can be drawn at a temperature that is greater than the melting temperature of the primary core material and less than the melting temperature of the oxide. During the drawing a portion of the oxide of the preform clad can dissolve into the preform core and can then be reduced according to a reaction between the oxide and the scavenger to form a solid and a volatile by-product. In addition, during the drawing the primary core material can be melted and can spontaneously crystallizing upon cooling.

BRIEF DESCRIPTION OF THE FIGURES

FIG. 16 demonstrates the powder x-ray diffraction (PXRD) of Si and SiC precursors for two different intensity scales including 0 to 9000 arbitrary units (a.u.) (FIG. 16A) and 0 to 1000 a.u.

FIG. 17 demonstrate the PXRD of the core of an optical fiber formed from a preform including a silica cladding material and an Si/SiC core material on two different scales including 0 to 50 a.u.

Figure 1:
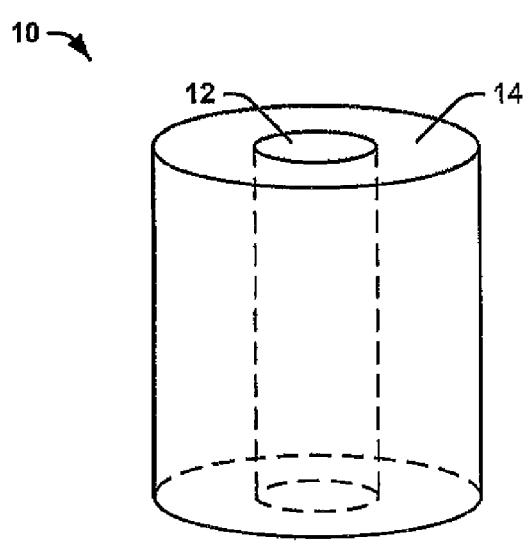
FIG. 1 demonstrates an example of a preform for forming an optical fiber in accordance with an aspect of the disclosure.

Repeat use of reference characters in the present specification and drawings is intended to represent the same or analogous features or elements of the present disclosure.

DETAILED DESCRIPTION

Reference will now be made in detail to various embodiments of the disclosure, one or more examples of which are illustrated in the accompanying drawings. Each example is provided by way of explanation of the subject matter, not limitation thereof. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

The present disclosure relates generally to optics, and more particularly to optical fiber systems and methods. According to disclosed methods and systems, an optical fiber can be formed having a crystalline core and an oxide glass clad with little or no oxygen impurities in the core.

More specifically, an optical fiber can be formed from a preform that includes a clad material and a core material. The clad material includes an oxide, for instance an oxide glass. The core material includes a primary core material and a scavenger for oxide that may dissolve or precipitate into the core from the adjacent clad material during the fiber formation process. The scavenger can reduce oxide that dissolves or precipitates into the core to produce a solid that can be the same material as the core primary component (e.g., silicon) and volatile by-products. The volatile by-products may evolve out of the system. In addition, the primary material of the core can melt during the fiber formation process and crystallize upon cooling leaving the formed optical fiber with a crystalline core and little or no impurities due to precipitation of the oxide into the core.

A crystalline core can exhibit a Raman gain from approximately 1,000 to 10,000 times that which can be achieved with a fiber including an amorphous core. As a result, a fiber amplifier including a crystalline core can achieve a significant Raman gain with a much shorter fiber length than a typical fiber amplifier having an amorphous core. In addition, because optical signals that are launched into an amplifier can achieve such significant amplification, optical pump energy can be significantly reduced to achieve optical signals of a similar magnitude as has been achieved in the past using amplifiers of fibers that have an amorphous core.

It is to be understood that, as described herein, the term "crystalline" generally refers to polycrystalline as well as single crystal materials. Accordingly, use of the term "crystalline" is not intended to exclude either polycrystalline materials or single crystal materials unless specifically described as such. In addition, the term "single crystal" generally refers to a crystalline material that does not include grain boundaries within the material. For example, a single crystal core can include substantially no grain boundaries within that length of the fiber that is referred to as a "single crystal core."

The crystalline core fibers may be formed by drawing a preform under temperature conditions at which the at least a portion of the core material becomes molten and at which the clad material can be drawn. During formation, the scavenger can react with oxide that precipitates into the core and, as the drawn fiber cools, the volatile products of the oxide reduction reaction can evolve out of the fiber and the remaining core material can spontaneously crystallize. The drawing process can provide a single crystal core, as well as polycrystalline core. In addition, the crystalline core can be isotropic (e.g., cubic) or anisotropic.

FIG. 1 demonstrates an example of a preform 10 for forming an optical fiber. The preform 10 includes a core material 12 and a cladding material 14. The preform 10 can be drawn to form an optical fiber. The cladding material 14 can be any of a variety of oxide materials. For example, the cladding material 14 can include oxide glasses, such as silicate glasses, phosphate glasses, germanate glasses, and the like. By way of example, silica glass, borosilicate glass, and so forth can be utilized in forming the cladding material 14. Furthermore, the cladding material 14 can be doped with any of a variety of dopants to achieve a desired refractive index, thermal expansion coefficient, and draw temperature such that it draws into fiber at a temperature above the melt temperature of the primary material of the core.

The core material 12 can include as a primary core material a material that will be crystallized during fiber formation to form the crystalline core of the drawn fiber. For instance, the primary core material can include a semiconductor such as Group IV elements or compounds, including silicon (Si), germanium (Ge) or SiGe. Other semiconductor compounds that can be utilized as the core material can include Group III-V compounds, such as gallium arsenide (GaAs), or indium phosphate (InP) as well as Group II-VI compounds including cadmium sulfide (CdS), cadmium selenide (CdSe), Zinc Sulfide (ZnS), or zinc selenide (ZnSe). In one embodiment, the primary core material can be the cation of the oxide used to form the clad.

In addition to the primary core material, the core material 12 can include a scavenger for the oxide that forms cladding material 14. For example, in an embodiment in which the cladding material is silica, the core material can include an amount of a scavenger for silica, such as silicon carbide (SiC). The scavenger of the core material can include any material that can operate under similar thermodynamic principles as the $SiO_2$/SiC scavenger system, i.e., the reduction of the oxide can take place at the conditions of the fiber draw during which the primary core material is molten and the cladding material is at a viscosity to provide an acceptable draw.

During fiber formation, as the primary core material becomes molten, an amount of the cladding material can dissolve into the core melt and result in the formation of precipitates in the resultant core material. The scavenger that is included in the core material can react with the precipitate to reduce the oxide. Reaction of the scavenger with oxide cladding material that precipitates into the core during processing will form as a reaction product a solid that can be either the primary core material itself or a material that is compatible by solid solution. For example, when considering a fiber formed of a germanium oxide clad, the reduction product of germanium oxide precipitate in the core can include germanium. In this embodiment, the primary core material can be germanium, or can be a material that is compatible with germanium by solid solution, such as silicon, which can form an SiGe solid solution in the core with the germanium reduction product. The solid reduction product can crystallize with the rest of the primary core material during formation of the drawn crystalline fiber. This is not a requirement however, and in another embodiment, the solid reduction product can remain in the resultant core without crystallizing. Volatile by-products of the reduction process can evolve out of the system.

The preferred amount of scavenger added to the core material can depend upon the specific materials of the system. For instance, the amount of oxide impurities found in previously known systems can be utilized as a guide to determine the preferred amount of oxide scavenger in the core. In one embodiment, the amount of scavenger can be between about 0.5% and about 20% by weight of the core material, for instance between about 1% and about 10% by weight.

Core material 12 can also include one or more dopants as are known in the art such as selected Group III and IV elements, rare earth elements, transition metals, and so forth. For instance, the core material 12 can be N-doped or P-doped according to known practice.

The core material 12 can be provided in any suitable form. For instance, the core material 12 can be a mixture of the primary core material and the scavenger as a plurality of chips, as a powder, or in any other form. Moreover, the primary core material can be provided in a crystalline form or in an amorphous form.

In one embodiment, the core material 12 including both the primary core material and the scavenger in a mixture can be compacted to form a solid rod. This may serve to limit the amount of air for removal during the fiber formation. In another embodiment, however, it may be preferred to provide the core material 12 to the preform as a powder or particle mixture including the primary core material and the scavenger, with no compacting prior to loading the core material in the cladding preform. According to this embodiment, the voids in the mixture can encourage quicker removal of volatile reactants from the fiber during formation.

As described in greater detail below, the preform 10 can be drawn to form an optical fiber having a single crystalline or polycrystalline core. The resultant crystalline core fiber can exhibit a Raman gain from approximately 1,000 to 10,000 times that which can be achieved in an amorphous oxide or chalcogenide core. As such, the resultant optical fiber can be formed with significantly shorter lengths to achieve similar desired Raman amplification relative fiber amplifiers that include an amorphous oxide or chalcogenide core. The increased Raman gain can also result in a substantial reduction in pump power necessary to achieve similar levels of amplification relative to typical fiber amplifiers. In addition, a resultant optical fiber can maintain a substantially narrow Raman line width, as well as wide wavelength range of the optical signal, such as from tunable mid-wavelength infrared (MWIR) sources.

Moreover, due to the very low content of oxygen and/or oxide impurities in the core of the fiber, the fiber can demonstrate excellent transparency and very little light scattering out of the core.

A preform 10 can be formed by first forming the cladding material 14 with the desired geometry. In the example of FIG. 1, the cladding material 14 is demonstrated as substantially cylindrical. However, it is to be understood that the cladding material 14 can have any of a variety of cross-sectional shapes, such as rectangular, elliptical, or "D"-shaped. As an example, a hole can be drilled in the cladding material 14, such as substantially at a center axis or cross-sectional centroid of the cladding material 14 to form a tubular shape having open ends as illustrated in the example of FIG. 1.

Figure 2:
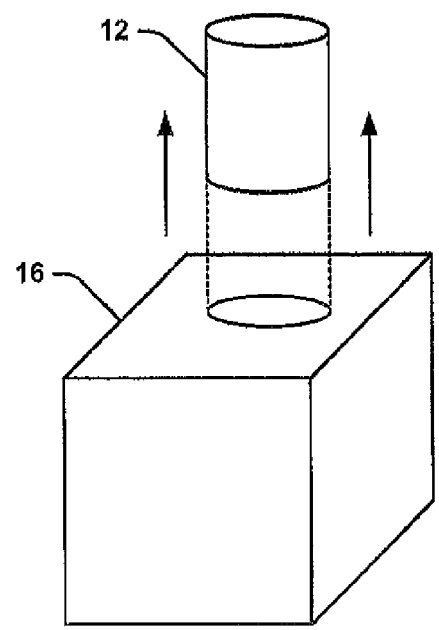
FIG. 2 demonstrates an example of core-drilling a core material rod for forming an optical fiber in accordance with an aspect of the disclosure.

The core material 12 can be in any suitable starting formation, such as a boule, window, slug, a plurality of chips, a powder, and so forth. For example, the core material 12 can be a compacted powder including the primary core material and the scavenger and shaped in the form of a boule. FIG. 2 demonstrates an example of core-drilling a compacted core material 12 in the form of a rod. As described herein, the term "core-drilling" can refer to the use of a cylindrical core-drill, or can refer to boring, pressing, and/or stamping a boule 16 to generate a rod of the core material 12. Although the example of FIG. 2 demonstrates that the boule 16 is cubical in shape, it is to be understood that a boule can have any of a variety of shapes, such as substantially cylindrical or spherical.

Referring again to FIG. 1, the core material 12 can be inserted or "sleaved" in a hole that has been drilled into the cladding material 14. It is to be understood that core-drilling to obtain a rod of the core material 12, as demonstrated in the example of FIG. 2, and sleaving the rod of core material 12 into the cladding material 14 is one of a variety of different ways to form the preform 10. In one embodiment, the preform 10 can be formed by vapor deposition of the primary core material and the scavenger that together form the core material 12 in the hole that has been drilled into the cladding material 14. The two materials can be deposited in a single process or in sequential processes, as desired. As another example, the hole can be filled with the core material 12 in the form of a powder or a plurality of chips to locate the core material 12 within the cladding material 14. Thus, the preform 10 can be generated in any of a variety of ways. The resultant preform 10 can be drawn into an optical fiber, such as via a fiber drawing tower.

Figure 3:
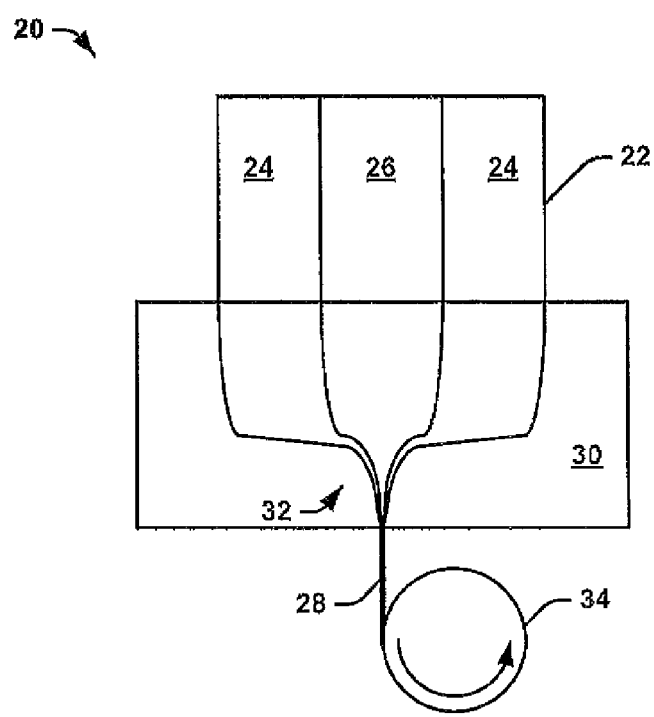
FIG. 3 demonstrates an example of a system for forming an optical fiber in accordance with an aspect of the disclosure.

FIG. 3 demonstrates an example of a system 20 for forming an optical fiber. The system 20 demonstrates a preform 22 that includes a cladding material 24 and a core material 26, such as similar to the preform 10 in the example of FIG. 1. For example, the cladding material 24 can be an oxide glass and the core material 26 can be a crystalline or amorphous semiconductor primary core material mixed with a scavenger for the oxide glass of the cladding material. In the example of FIG. 3, the preform 22 is being drawn to form an optical fiber 28.

The system 20 includes a hot zone 30, such as can be included in a fiber drawing tower furnace. As an example, the hot zone 30 can apply heat that is sufficient to soften the cladding material 24 and to melt at least the primary core material. Specifically, the hot zone 30 can be set to a temperature that is above the melting point of the primary core material and at which the cladding material 24 is sufficiently soft so as to draw as desired. In general, the hot zone can be set to a temperature that is beneath the melting point of the scavenger of the core material 26, though this is not a requirement. Temperatures for the hot zone 30 during a drawing process can depend upon materials included in the preform 22, the size of the preform 22 and the fiber 28, and the like.

The draw temperature at which the primary core material is molten and the clad material 24 is at a viscosity to provide an acceptable draw can be only slightly above the melting temperature of the primary core material. For instance, the draw temperature can be less than about 10° C. above the melting temperature of the primary core material, for instance between about 1° C. and about 10° C. above the melting temperature of the primary core material. This may be preferred in an embodiment in which the melting temperature of the primary core material and the targeted drawing temperature of the cladding material 24 can be quite close to one another. However, as an alternative example, the drawing temperature of the hot zone 30 can be greater than about 10° C. higher than the melting temperature of the primary core material, for example greater than about 20° C. higher, greater than about 50° C. higher, or more. Furthermore, the expansion coefficients of the core material 26 and the cladding material 24 can be substantially similar, or even substantially the same. However, it is to be understood that the expansion coefficient of the core material 26 and the cladding material 26 can also differ.

In general, the draw can be carried out under atmospheric conditions. This is not a requirement, however, and the draw can alternatively be carried out under vacuum (e.g., complete or partial vacuum), in a reducing atmosphere, or under an inert atmosphere. While not wishing to be bound to any theory, drawing under a vacuum may improve the rate of removal of volatile by-products from the resultant fiber, but does not reduce the amount of oxide that precipitates from the cladding, and the presence of the scavenger is the key component for prevention of oxygen impurities in an oxide clad/crystalline core fiber.

According to the example of FIG. 3, the preform 22 can be drawn from a first end 32 to form the optical fiber 28. During the draw process, the soft but non-molten cladding material 24 can act as a crucible to confine the molten primary core material as it is drawn into the optical fiber 28. During and following the draw, cladding material that precipitates into the core can react with the scavenger of the core material 24. The resultant optical fiber 28 can then cool to form a crystalline (i.e., single crystal or polycrystalline) core with little or no oxygen in the core. For example, the core of the drawn fiber can have less than about 15 at.% oxygen, less than about 10% at.% oxygen, or less than about 5 at.% oxygen.

Beneficially, the crystalline core can be formed without the use of a crystal seed. The resultant crystalline core can be single-mode or multimode. The optical fiber 28 can be wound around a take-up reel 34 as it leaves the hot zone 30, such that it can cool and solidify. The optical fiber 28 can subsequently be run through a polymer bath (not shown), such that a jacketing material can be coated onto the optical fiber 28.

The optical fiber 28 can propagate a variety of different types of optical signals, such as passive mid-wavelength infrared (MWIR), long-wavelength infrared (LWIR), or terahertz (THz) propagation.

The optical fiber 28 can likewise be implemented in a variety of applications. As an example, the optical fiber 28 can be implemented as a Raman gain amplifier, such as in a communications or imaging system. As another example, the optical fiber 28 can be implemented in any of a variety of laser applications. Furthermore, as described in greater detail below, variations of the optical fiber 28 can be implemented in electro-optic fiber modulators or fiber Faraday isolators.

Beneficially, fabrication of an optical fiber 28 from a preform 22 can be accomplished in a facile manner. Specifically, upon forming the preform 22, the resultant optical fiber 28 can be formed in a manner similar to typical fiber amplifiers that have an amorphous core material. However, the optical fiber 28 can exhibit superior optical performance due to the crystalline material core and the lack of oxygen impurities in the core. It is to be understood that the system 20 in the example of FIG. 3 is demonstrated simplistically, and that any of a combination of fiber forming techniques can be implemented in forming the resultant optical fiber 28. Specifically, the system 20 is not intended to be limited to the example of FIG. 3.

Figure 4:
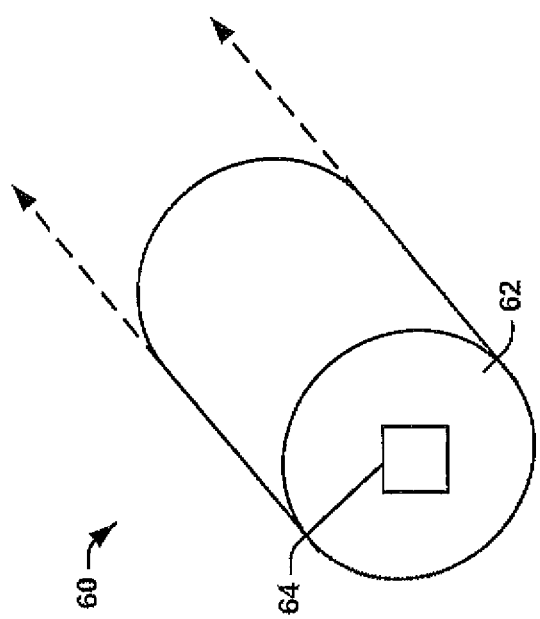
FIG. 4 demonstrates another example of an optical fiber in accordance with an aspect of the disclosure.

The core material of a given preform, such as the preform 10 in the example of FIG. 1, is not limited to having a circular cross-section. FIG. 4 demonstrates another example of a drawn optical fiber 60. The optical fiber 60 includes a cladding 62 and a core 64. The cladding 62 can be an oxide glass, and the core 64 can be a crystalline material, similar to as described above in the examples of FIGS. 1 through 3. However, in the example of FIG. 4, the core 64 is demonstrated as having a substantially rectangular (e.g., square) cross-section.

A rectangular cross-sectional core 64 can be implemented in the optical fiber 60 such that the optical fiber 60 has a large index contrast. As an example, the optical fiber 60 can be implemented as a small signal image amplifier for a Talbot self-imaging length with a non-depleted pump. As another example, the optical fiber 60 can be implemented as a high power beam combiner at high pumping levels. The forming of the core 64 from the crystalline material can thus result in a very efficient high power beam combiner.

Figure 5:
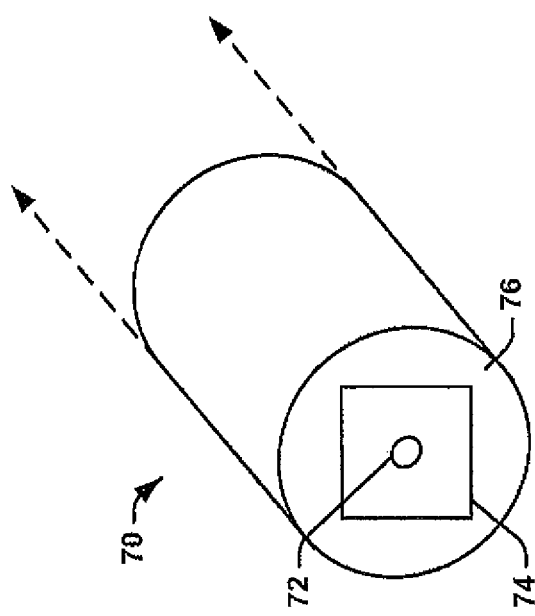
FIG. 5 demonstrates another example of an optical fiber in accordance with an aspect of the disclosure.

FIG. 5 demonstrates another example of an optical fiber 70. The optical fiber 70 can be a resultant drawn optical fiber, such as the resultant optical fiber 28 in the example of FIG. 3. The optical fiber 70 includes a cladding 76, a pump cladding 74, and a core 72. The cladding 76 can be formed of any of a variety of glass materials. For example, the cladding material 76 can include oxide glasses, such as silicate glasses, phosphate glasses, germanate glasses, and the like. The cladding material 76 can include other glasses such as halide glasses, an example of which is fluoride glasses. As another example, cladding material 76 can include chalcogenides such as sulfide glasses, selenide glasses, telluride glasses, and so forth.

The pump cladding 74 can be formed from an oxide glass material. The cladding material 76 and the pump cladding 74 can be formed of the same or different glasses such as different respective glass materials or the same glass material with different dopants.

The core material 72 can include a primary core material and a scavenger for the oxide of the pump cladding, similar to as described above in the examples of FIGS. 1 through 3. The core 72 can be configured as a multimode core.

In the example of FIG. 5, the pump cladding core 74 is demonstrated as having a substantially rectangular (e.g., square) cross-section, and is configured to receive pumped optical energy. As a result, Raman gain in the multimode core 72 can be efficiently saturated by the injected Stokes wavelength signal that is provided in the pumped optical energy. Accordingly, self-imaging in the multimode core 72 can generate a diffraction limited beam. In addition, the configuration of the optical fiber 70 can enable the pump cladding 74 to be substantially large for practical lengths of the optical fiber 70.

Figure 6:
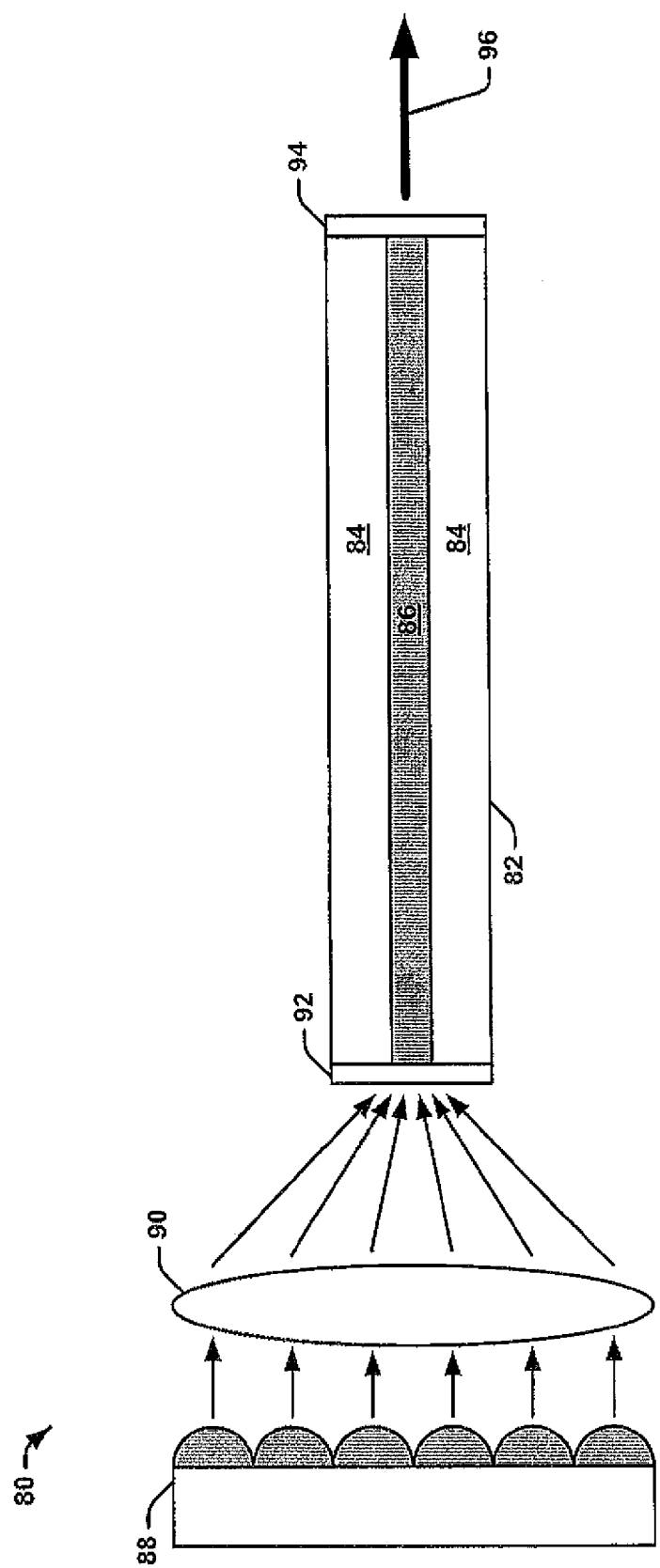
FIG. 6 demonstrates an example of an optical system in accordance with an aspect of the disclosure.

FIG. 6 demonstrates an example of an optical system 80. The optical system 80 can be implemented in any of a variety of optical applications, such as for optical network communications or for optical imaging systems. The optical system 80 includes an optical fiber 82, such as the resultant optical fiber 28 in the example of FIG. 3. Therefore, the optical fiber 82 includes a cladding 84 which can be formed from an oxide glass, and a core 86 that can be formed from a crystalline material and is substantially free of oxygen and/or oxide impurities.

In the example of FIG. 6, the optical fiber 82 can be configured as a Raman gain amplifier. In this embodiment, a laser diode pump array 88, for example, an array comprising Quantum Cascade Lasers operating at mid-infrared wavelengths, can be configured to provide high brightness pump radiation to a focusing lens 90. The focusing lens 90 focuses the pump radiation and launches it into the optical fiber 82 through a dichroic mirror 92 providing high reflectivity at the Stokes wavelength but high transmission at the pumping wavelength. A partially transmitting output mirror 94 is coupled to the optical fiber 82 at an opposite end of the optical fiber 82 from the high reflectivity dichroic mirror 92. As a result, the high brightness pump radiation propagates between the high reflectivity dichroic mirror 92 and the partially transmitting output mirror 94. Beneficially, this output mirror 94 can also be a dichroic mirror providing high reflectivity at the pumping wavelength and partial transmission at the Stokes wavelength to reflect back the unconverted pump power and increase efficiency. Accordingly, the oscillating Stokes power results in a high efficiency conversion of the pump power to an output beam 96 through the partially transmitting output mirror 94.

As described above, the core 86 can be formed from a crystalline material. Therefore, the optical fiber 82 can exhibit a very high Raman gain and the optical system 80 can be implemented as a direct diode pumped Raman oscillator.

Typical optical fibers, such as including an amorphous core, do not have a sufficient gain to be implemented as a direct diode pumped Raman oscillator with available pump brightness. However, the substantially greater Raman gain that is exhibited by the optical fiber 82 permits such a low-threshold direct diode pumped Raman fiber oscillator.

It is to be understood that the optical system 80 is not limited to the example of FIG. 6. As an example, the optical system 80 is demonstrated simplistically in the example of FIG. 6. As such, additional optical components, such as additional lenses and/or mirrors can be included in the optical system 80. Therefore, the optical system 80 can be configured in any of a variety of ways, and can be implemented in any of a variety of optical applications.

Figure 7:
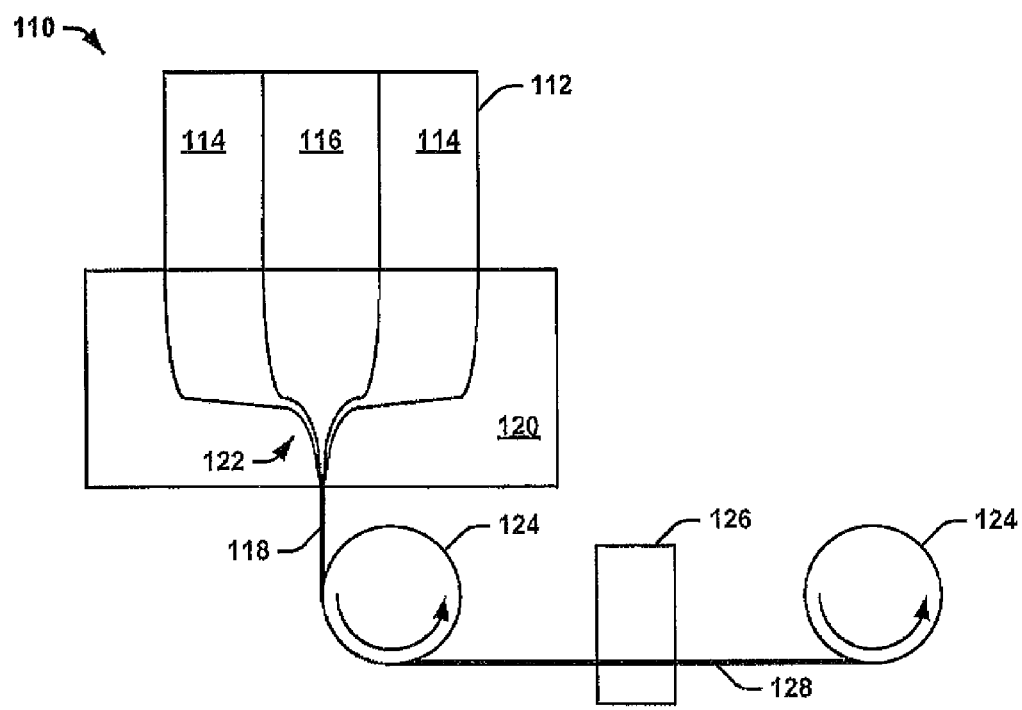
FIG. 7 demonstrates another example of a system for forming an optical fiber in accordance with an aspect of the disclosure.

FIG. 7 demonstrates another example of a system 110 for forming an optical fiber. The system 110 demonstrates a preform 112 that includes a cladding material 114 and a core material 116. As such, the preform 112 is configured substantially similar to the preform 10 in the example of FIG. 1. The cladding material 114 can be an oxide glass and the core material 116 can include a primary core material and a scavenger for the oxide glass of the clad material. In the example of FIG. 7, the preform 112 is being drawn to form a first optical fiber portion 118.

The system 110 includes a first hot zone 120, such as can be included in a fiber drawing tower furnace. As an example, the first hot zone 120 can apply heat that is sufficient to soften the cladding material 114 and to melt the primary core material of the core material 116. The core material 116 of the preform can include an amount of a scavenger for the oxide glass of the cladding material 114 so as to reduce any oxide that may precipitate into the core during the draw that takes place in the first hot zone.

In the first hot zone 120, the preform 112 is stretched from a first end 122 to form the first optical fiber portion 118. The first optical fiber portion 118 can be wound around a first take-up reel 124 as it leaves the first hot zone 120, such that it can cool and solidify. Upon cooling, the first optical fiber portion 118 can have a crystalline core that can be single mode or multimode.

The first optical fiber portion 118 can be unwound from the first take-up reel 124 and passed through a second hot zone 126. The second hot zone 126 can have a temperature that is less than the temperature of the first hot zone 120, such as at an approximate crystallization temperature of the crystalline material of the core of the first optical fiber portion 118. As an example, the temperature can be substantially near and below the melting point of the crystalline material core of the first optical fiber portion 118. For instance, the temperature of the second hot zone 126 can be between the melting point and about 5° C. less than the melting point of the crystalline material core of the first optical fiber portion 118, or between the melting point and about 10° C. less than the melting point, in another embodiment.

While there may be some solid-state reactions/diffusions taking place during the recrystallization of the second hot zone leading to oxygen in the core, this will lead to markedly less oxygen impurity in the core than the dissolution during the draw of the first hot zone. However, scavenger in the core material can reduce any oxygen impurities that may come about during this recrystallization process similar to that carried out during the initial draw.

The core of the first optical fiber portion 118 recrystallizes as it passes through the second hot zone 126. A resultant optical fiber 128 can be output from the second hot zone 126 having a single crystal core. The resultant single crystal optical fiber 128 can be wound around a second take-up reel 130 as it leaves the second hot zone 126, where it can cool. The resultant optical fiber 128 can subsequently be run through a polymer bath (not shown), such that a jacketing material can be coated onto the resultant optical fiber 128.

In one embodiment, a single crystal seed of the same type as the primary core material of the core of the first optical fiber portion 118 can be placed at a leading end of the first optical fiber portion 118, for example, prior to or concurrently with the first optical fiber portion 118 entering the second hot zone 126. Accordingly, the seed can template the orientation of the crystalline material of the core of the first optical fiber portion 118, such as for an anisotropic crystalline material. In this embodiment, the orientation of the lattice structure of the core of the first optical fiber portion 118 may become substantially aligned with the lattice of the single crystal seed as the first optical fiber portion 118 passes through the second hot zone 126. Accordingly, the lattice structure of subsequent portions of the core of the first optical fiber portion 118 entering the second hot zone 126 can align with the newly aligned portions, and so on for subsequent portions of the core entering the second hot zone 126. The resultant optical fiber 128 can have a single crystal core upon cooling.

Because the core of the resultant optical fiber 128 is crystalline, the core can exhibit more effective polarization. As a result, a variety of optical devices can be implemented utilizing the resultant optical fiber 128. As an example, Chi-2 devices such as frequency doublers, optical parametric amplifiers, electro-optical modulators, Faraday isolators, interferometric microwave sensors, and phase modulated lasers can be manufactured using the resultant optical fiber 128. Such devices can be substantially more efficient when implementing Chi-2 processes within an optical fiber as opposed to implementation within bulk crystals or planar waveguides.

Figure 8:
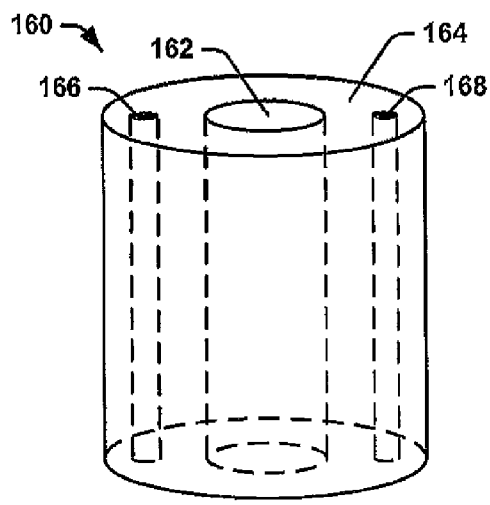
FIG. 8 demonstrates an example of a preform for forming an optical fiber device in accordance with an aspect of the disclosure.

FIG. 8 demonstrates an example of a preform 160 for forming an optical fiber device in accordance with an aspect of the disclosure. The preform 160 includes a cladding material 164 and a core material 162 that includes a primary core material and a scavenger for the cladding material. The preform 160 also includes a first conductive material 166 and a second conductive material 168 formed at two separate locations in the preform 160. In the example of FIG. 8, the first and second conductive materials 166 and 168 are disposed symmetrically about the cross-sectional center of the preform 160. However, the conductive materials 166 and 168 need not be disposed symmetrically about the central axis of the preform 160. The first and second conductive materials 166 and 168 can be any of a variety of conductive materials, such as aluminum, copper, gold, platinum, silver, and so forth.

The preform 160 can be formed by first forming the cladding material 164 to the desired geometry, as previously described. Holes can be drilled in the cladding material 164, such as one hole substantially at a center axis or cross-sectional centroid of the cladding material 164, and two holes symmetrically disposed with respect to the center hole. The core material 162 can be formed, inserted, or sleaved in the center hole that has been drilled into the cladding material 164 and the first and second conductive materials 166 and 168 can be inserted into the symmetrically disposed holes. The resultant preform 160 can then be drawn into a resultant fiber, such as via a fiber drawing tower.

Figure 9:
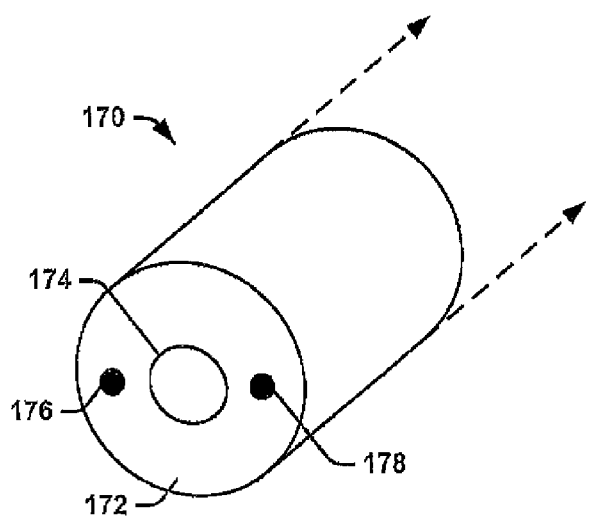
FIG. 9 demonstrates an example of an optical fiber device in accordance with an aspect of the disclosure.

FIG. 9 demonstrates an example of an optical fiber device 170 that can result from drawing the preform 160 of FIG. 8. The optical fiber device 170 is demonstrated in the example of FIG. 9 as having a cladding 172, a core 174, a first conductor 176, and a second conductor 178. In addition, the optical fiber device 170 is not limited to having two conductors, but can instead have a single conductor or can include three or more conductors.

The first and second conductors 176 and 178 in the example of FIG. 9 can be configured to carry electrical currents for a variety of purposes. As an example, the first and second conductors 176 and 178 can be used to carry signals or power. As another example, the first and second conductors 176 and 178 can be configured to implement electro-optical effects on an optical signal that is propagated on the core 174. In one embodiment, the core 174 can be a crystalline core that is polarized via a polarization process. Therefore, electrical signals that are applied to the first and second conductors 176 and 178 can generate an electric field through the polarized crystalline core 174 to vary a propagation speed of the optical signal therein. Accordingly, phase modulation of an optical signal can be achieved directly in an optical fiber based on the electro-optical effects that can be implemented via the first and second conductors 176 and 178.

Figure 10:
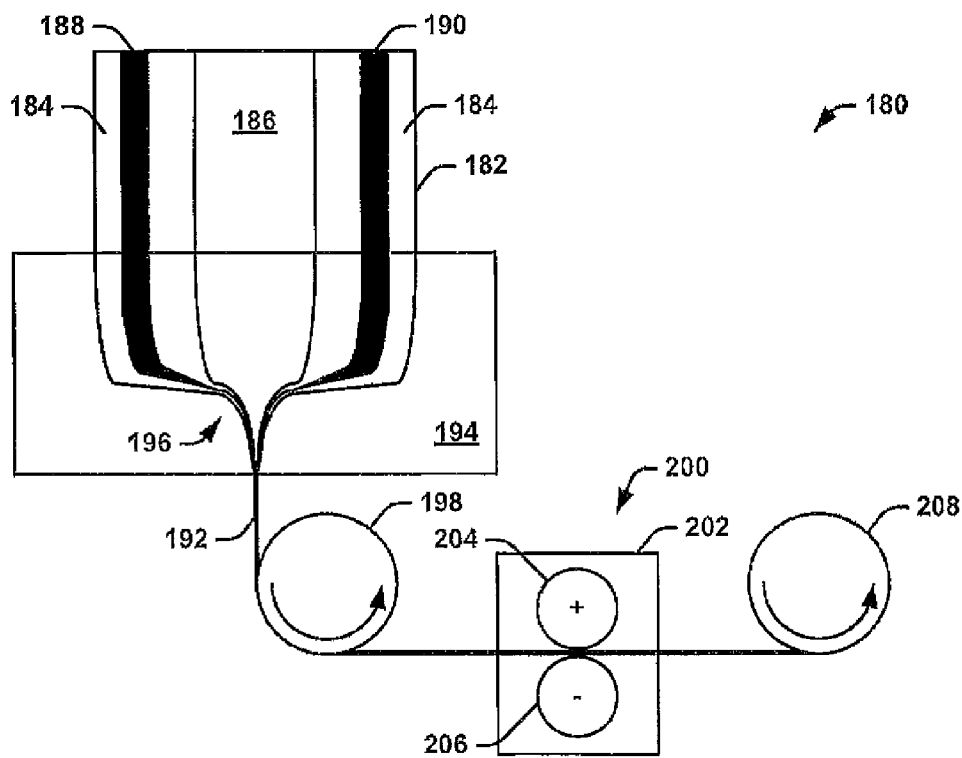
FIG. 10 demonstrates an example of a system for forming an optical fiber device in accordance with an aspect of the disclosure.

The system 180 of FIG. 10 demonstrates a preform 182 that includes a cladding material 184, a core material 186 that includes a primary core material and a scavenger for the cladding material, a first conductive material 188, and a second conductive material 190. The system 180 includes a hot zone 194, such as can be included in a fiber drawing tower furnace.

The system 180 also includes a polarization system 200. The polarization system 200 includes a second hot zone 202 that is configured to apply heat at an approximate Curie temperature to the optical fiber device 192. As a result, the optical fiber device 192 loses innate polarization and dipole effects within the crystal lattice of the resultant core of the optical fiber device 192. The polarization system 200 also includes a first rolling electrode 204 and a second rolling electrode 206. As demonstrated in the example of FIG. 10, the first rolling electrode 204 has a positive voltage potential and the second rolling electrode 206 has a negative voltage potential. The first and second rolling electrodes 204 and 206 roll the optical fiber device 192 through the second hot zone 202. As the optical fiber device 192 exits the second hot zone 202 and cools, the crystalline core of the optical fiber device 192 experiences a spontaneous polarization effect. The polarized optical fiber device 192 can then be wound around a second take-up reel 208. The optical fiber device 192 can subsequently be run through a polymer bath (not shown), such that a jacketing material can be coated onto the optical fiber device 192.

Figure 11:
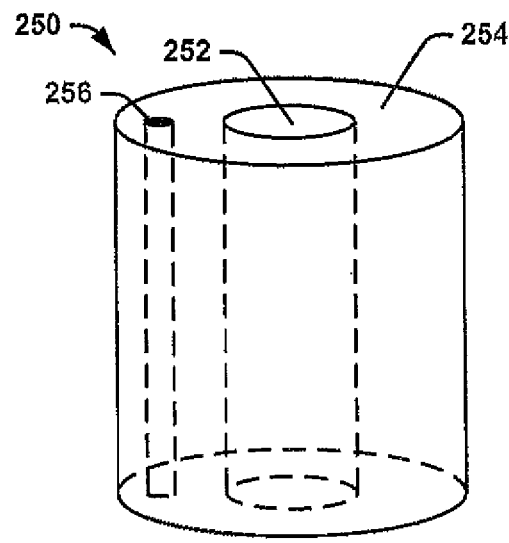
FIG. 11 demonstrates another example of a preform for forming an optical fiber device in accordance with an aspect of the disclosure.

FIG. 11 demonstrates another example of a preform 250 for forming an optical fiber device. The preform 250 includes a core material 252 and a cladding material 254. The core material 252 can include any of a variety of magneto-optical materials in addition to the oxide scavenger. As an example, the core material can be paramagnetic, and can include silicon as the primary core material and one or more rare-earth dopants in addition to the oxide scavenger. In general, the rare-earth dopant levels can be significantly higher than can be included in typical glass core fibers to maximize the Verdet constant. The resultant optical fiber device can have higher Raman gain, and optical losses can be substantially minimized. In addition, the preform 250 also includes a conductive material 256 located in the cladding material 254. The conductive material 256 can include any of a variety of conductive materials, such as aluminum, copper, gold, platinum, or silver.

The preform 250 can be formed similar to preforms as previously described. The preform 250 is then drawn into a resultant fiber at a temperature greater than the melting temperature of the primary core material, such as via a fiber drawing tower. In addition, as the preform 250 is being drawn, it can be rotated relative to the resultant optical fiber device, such that the conductive material 256 can be drawn helically around the core of the resultant optical fiber device.

Figure 12:
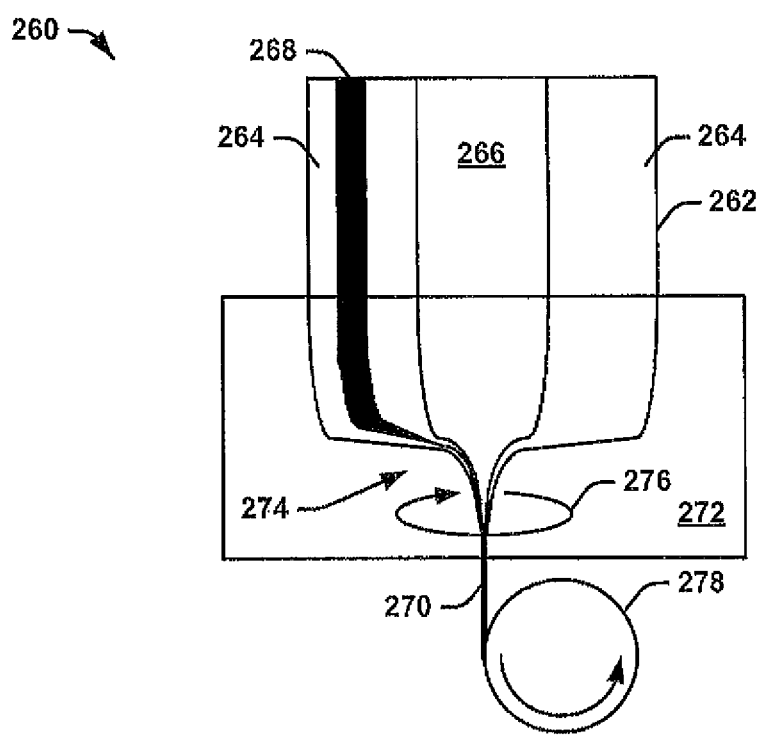
FIG. 12 demonstrates another example of a system for forming an optical fiber device in accordance with an aspect of the disclosure.

FIG. 12 demonstrates an example of a system 260 for forming an optical fiber device including a preform 262 that includes a cladding material 264, a core material 266, and a conductive material 268. The preform 262 is configured substantially similar to the preform 250 in the example of FIG. 11. In the example of FIG. 12, the preform 262 is being drawn to form an optical fiber device 270.

The system 260 includes a hot zone 272, such as can be included in a fiber drawing tower furnace. As an example, the hot zone 272 can apply heat that is sufficient to soften the cladding material 264 and to melt the primary core material of the core material 266. Thus, the preform 262 is drawn from a first end 274 to form the optical fiber device 270 with the conductive material 268 integrated therein. In addition, as it is stretched from the first end 274, the preform 262 is rotated to helically wind the conductive material 268 around the core material 266 as the optical fiber device 270 is being drawn, as demonstrated by the rotation arrow at 276. The resultant optical fiber device 270 can thus have a crystalline core that can be single-mode or multimode, and a conductor that extends helically around the crystalline core. The optical fiber device 270 can be wound around a take-up reel 278 as it leaves the hot zone 272, such that it can cool and solidify. The resultant optical fiber device 270 can be configured to implement magneto-optical effects, such as Faraday rotation of an optical signal therein. Accordingly, the resultant optical fiber device 270 can be used to manufacture Faraday isolators, optical polarizers, and/or transition fibers to reduce Fresnel losses.

The disclosure may be further understood with reference to the Example, set forth below.

EXAMPLE

An optical fiber was formed including a core of a mixture of silicon and silicon carbide and a clad formed of silicon dioxide. Specifically, silicon and silicon carbide powders were mixed and packed into a silica glass tube that was open on one end and sealed off at the other end to preclude the core material from emptying out. The preform was heated to about 1950° C. and drawn into optical fiber using the general process as is generally known in the art.

For comparison purposes, an optical fiber was formed according to a similar method, but the core material included only silicon, with no silicon carbide.

Without wishing to be bound by any theory, it is believed that during the draw process, which is carried out at a temperature above the melt temperature of silicon (1685K) and below the melt temperature of silicon dioxide, the following $SiO_2$ reduction takes place for $SiO_2$ that precipitates into the core:

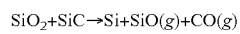

$$SiO_2 + SiC \rightarrow Si + SiO(g) + CO(g)$$

Figure 13A:
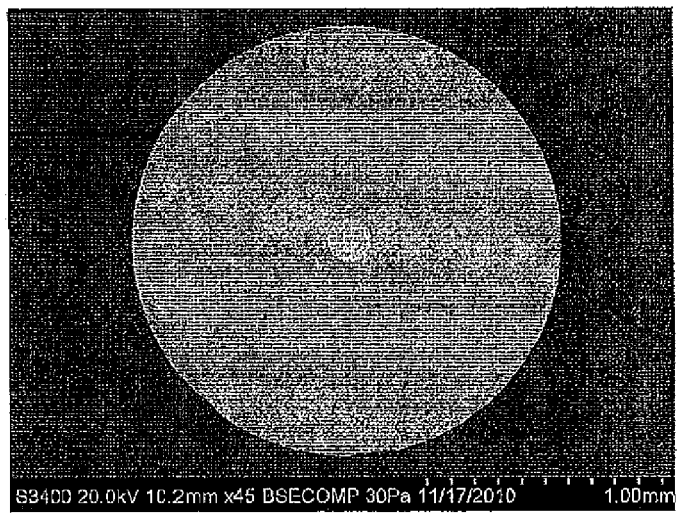
FIG. 13 demonstrate images of an optical fiber formed as described herein including FIG. 13A, which is a scanning electron microscope (SEM) image of the fiber, FIG. 13B, which is an elemental profile showing silicon content of the fiber, and FIG. 13C, which is an elemental profile showing oxygen content of the fiber.
Figure 13B:
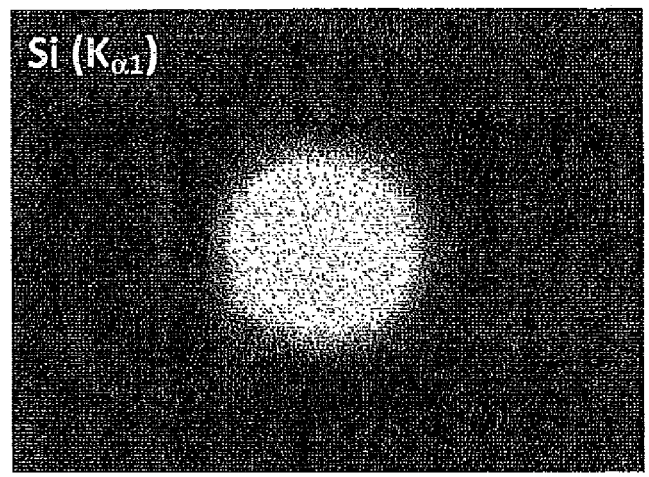
Figure 13C:
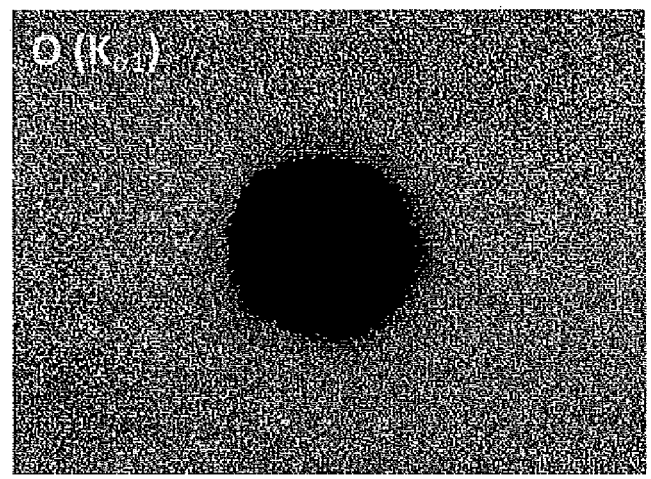

The drawn optical fiber formed from the Si/SiC core material is illustrated in FIG. 13A. FIG. 13B is an elemental profile showing silicon content and FIG. 13C is an elemental profile showing oxygen content. As can be seen, the elemental profile shows negligible oxygen content in the resultant core.

Figure 14:
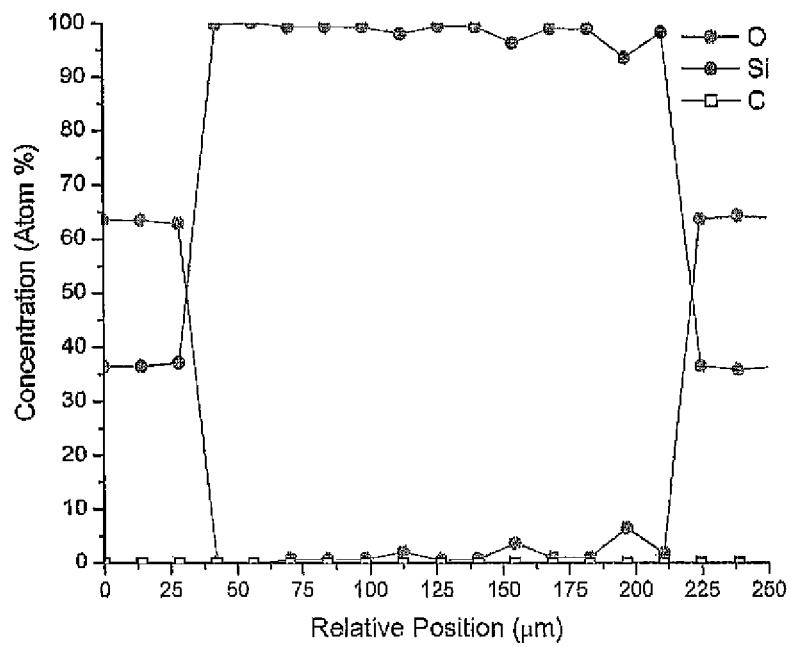
FIG. 14 demonstrates the energy dispersive spectroscopy (EDX) of a gold coated optical fiber formed from a preform including a silica cladding material and a silicon/silicon carbide (Si/SiC) mixed core material.

FIG. 14 demonstrates the EDX of the fiber formed from an Si/SiC core material. The results of the elemental analysis is demonstrated as performed approximately every 15 micrometers across the core/clad interface. There was no measurable oxygen content in the resultant fiber, and it appears that the scavenging by the SiC was essentially complete, at least to the sensitivity of measurement, which was about 1%.

Figure 15:
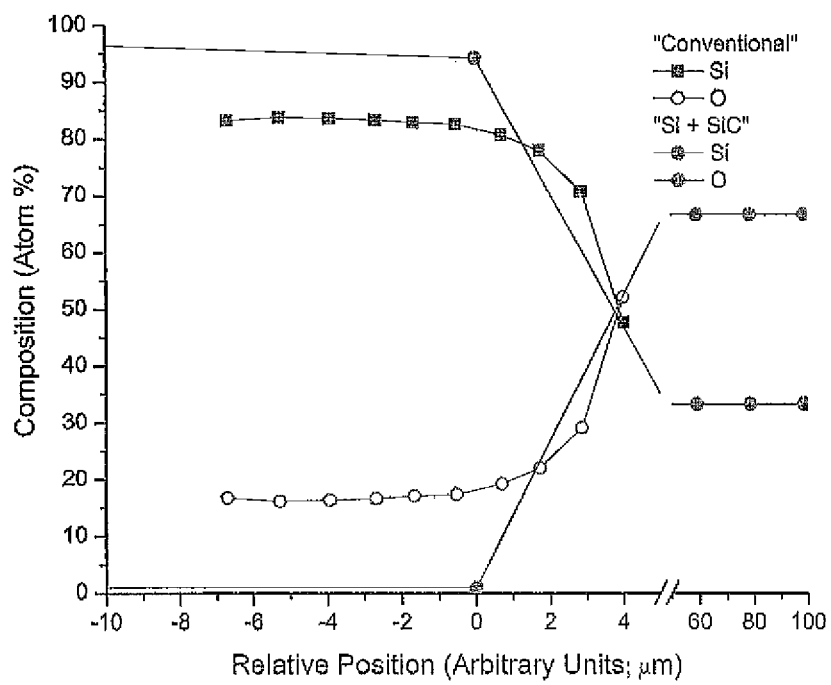
FIG. 15 compares the atomic composition of an optical fiber formed from a preform including a silica cladding material and an Si core material and a similar optical fiber formed from a preform including a silica cladding material and an Si/SiC core material.

FIG. 15 compares the atomic composition of an inventive and a comparison fiber. The results of the elemental analysis is demonstrated as performed approximately every 15 micrometers across the core/clad interface. As can be seen, the oxygen content in the comparison fiber was considerably higher than that for the inventive fiber.

Figures 16A, 16B:
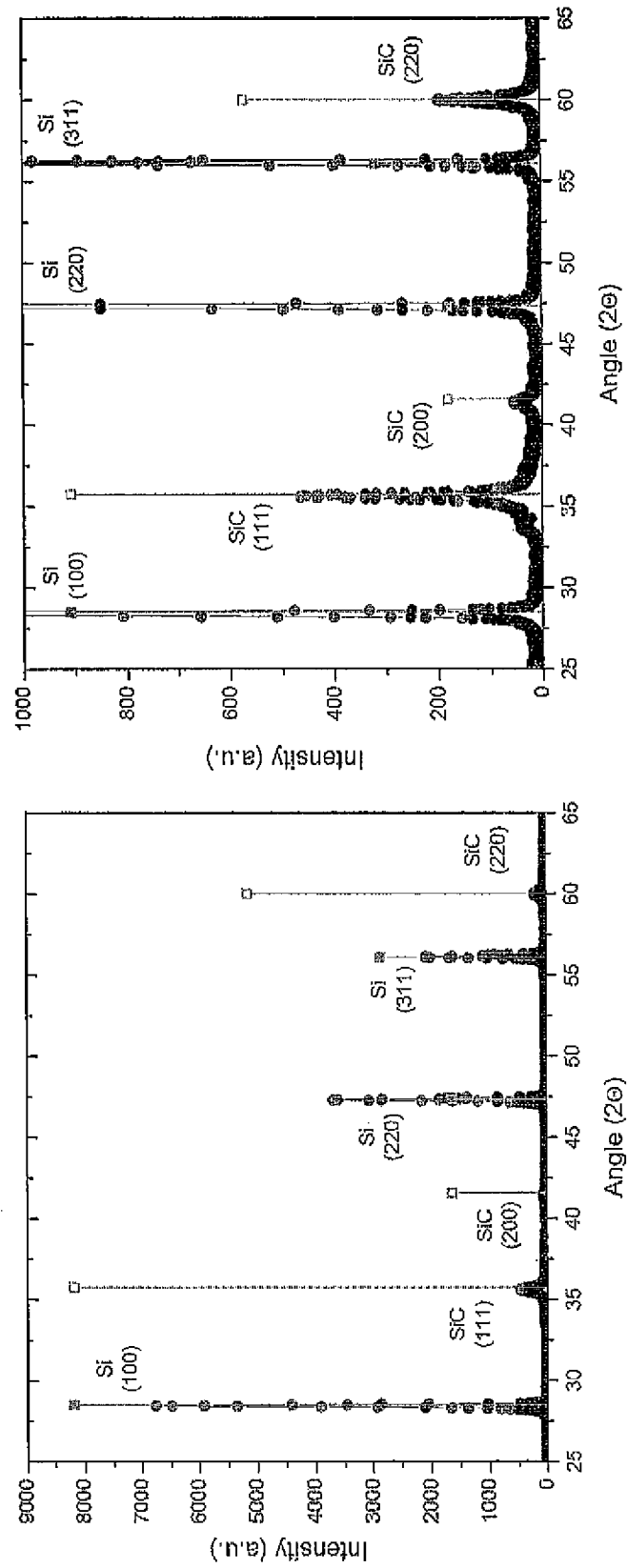
(FIG. 16B).

FIG. 16 demonstrates the powder x-ray diffraction (PXRD) scans of the Si and SiC precursors at two different intensity scales including 0 to 9000 a.u. (FIG. 16A) and 0 to 1000 a.u. (FIG. 16B). The raw PXRD scan includes the Si standard, the SiC standard, and the Si/SiC precursor mixture. The Miller indices are also includes. As expected, Si and SiC reflections were observed.

Figure 17B:
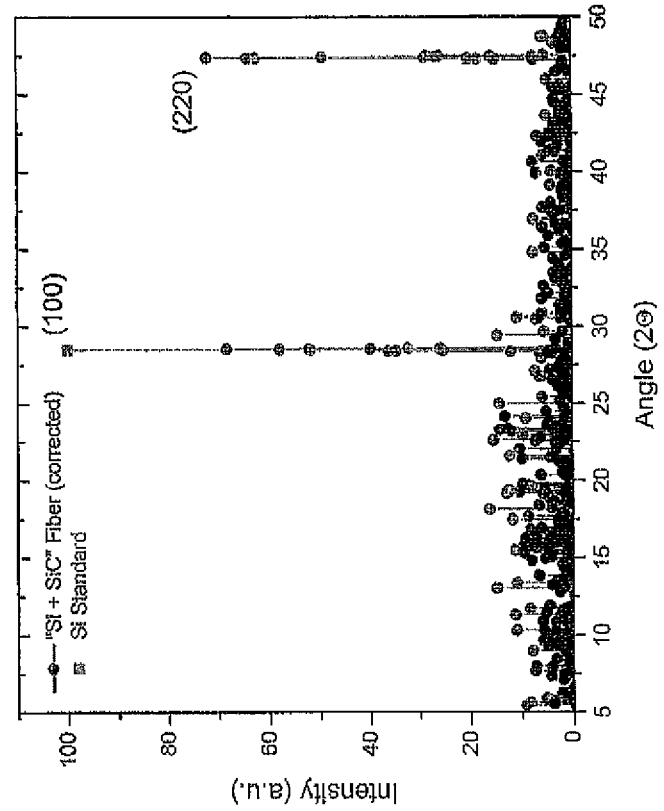
(FIG. 17B).
Figure 17A:
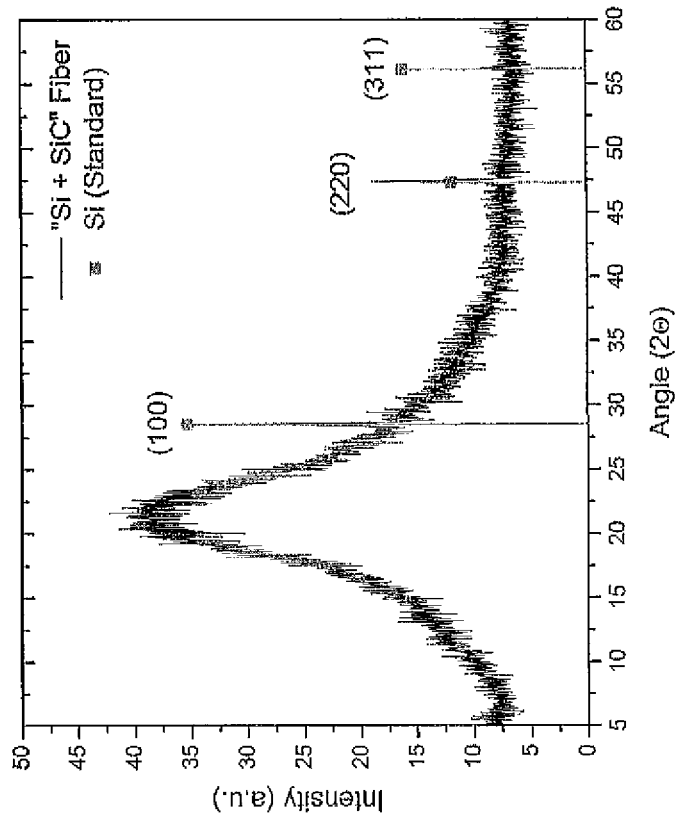
(FIG. 17A) and 0 to 100 a.u.

FIG. 17 demonstrate the PXRD of the core of the optical fiber formed from the Si/SiC core material on two different scales including 0 to 50 a.u. (FIG. 17A) and 0 to 100 a.u. (FIG. 17B). Significantly, only Si reflections are observed in the resulting fiber.

Figure 18:
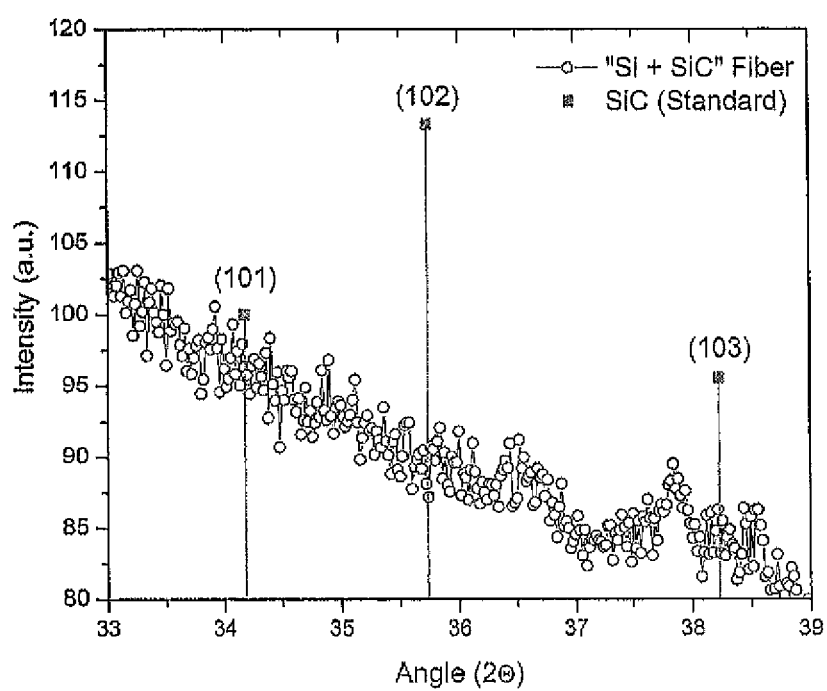
FIG. 18 demonstrates another PXRD of the core of an optical fiber formed from a preform including a silica cladding material and an Si/SiC core of an optical fiber.

FIG. 18 demonstrates another PXRD of the optical fiber formed from the Si/SiC core material. This scan was carried out according to a longer and slower x-ray scan as compared to the scan of FIG. 17. As can be seen no reflections from SiC can be observed.

What have been described above are examples. It is, of course, not possible to describe every conceivable combination of components or methodologies for purposes of describing the subject matter, but one of ordinary skill in the art will recognize that many further combinations and permutations of the subject matter are possible. Accordingly, the disclosure is intended to embrace all such alterations, modifications, and variations that fall within the scope of this application, including any appended claims.

What is claimed is:

1. An optical fiber comprising a core and a clad, the clad comprising an oxide glass, the core comprising a crystalline primary core material, the core further comprising a scavenger for an oxide of the oxide glass and/or comprising a reaction product of a reaction between the oxide of the oxide glass and the scavenger, and wherein the core includes less than about 15 atomic percent oxygen molecules.

2. A preform for forming the optical fiber of claim 1, the preform comprising a preform clad and a preform core, the preform clad comprising the oxide glass and the preform core comprising the primary core material and the scavenger for the oxide of the oxide glass.

3. The preform according to claim 2, wherein the preform core is in the form of a solid rod, chips or powder.

4. The preform according to claim 2, wherein the primary core material is crystalline or polycrystalline.

5. The preform according to claim 2, wherein the primary core material is amorphous.

6. The preform according to claim 2, wherein the preform core comprises the scavenger in an amount that is between about 0.5% and about 20% by weight of the preform core.

7. The preform according to claim 2, wherein an element of the oxide is the same as an element of the primary core material.

8. The optical fiber according to claim 1, wherein the crystalline primary core material of the core is a single crystalline core.

9. The optical fiber according to claim 8, wherein the single crystalline core is isotropic or anisotropic.

10. The optical fiber according to claim 1, wherein the crystalline primary core material of the core is a polycrystalline core.

11. The optical fiber according to claim 1, wherein the optical fiber is a polarized optical fiber.

12. A method for forming the optical fiber of claim 1, the method comprising:
    forming a preform core, the preform core comprising the primary core material and the scavenger for the oxide;
    forming a preform clad, the preform clad comprising the oxide; and
    drawing the preform core and the preform clad together to form the optical fiber, the preform core and the preform clad being drawn at a temperature that is greater than the melting temperature of the primary core material and less than the melting temperature of the oxide, wherein during the drawing a portion of the oxide of the preform clad dissolves into the preform core and is reduced according to a reaction between the oxide and the scavenger of the preform core, the reducing reaction between the oxide and the scavenger forming a solid, and wherein during the drawing the primary core material is melted, the primary core material spontaneously crystallizing upon cooling.

13. The method according to claim 12, wherein the preform core and the preform clad are drawn at a temperature that is less than the melting temperature of the scavenger.

14. The method according to claim 12, wherein the oxide is silica, the primary core material is silicon, and the scavenger is silicon carbide.

15. The method according to claim 12, wherein the solid formed by the reducing reaction comprises an element that is present in the primary core material.

16. The method according to claim 12, wherein the solid formed by the reducing reaction is a material that is the same as the primary core material.

17. The method according to claim 12, wherein the preform is drawn under a vacuum, in a reducing atmosphere, or under an inert atmosphere.

18. The method according to claim 12, wherein following the drawing of the preform to form the optical fiber, the method further comprises subjecting the optical fiber to a hot zone that is at a temperature that is at a crystallization temperature for the primary core material, the crystallization temperature being less than the melting temperature of the primary core material.

19. The method according to claim 18, the method further comprises locating a single crystal seed at a leading end of the optical fiber prior to subjecting the optical fiber to the hot zone.

20. The method according to claim 12, the preform clad comprising a conductive material, wherein following the drawing of the preform to form the optical fiber, the method further comprises subjecting the optical fiber to a hot zone that is at a temperature that is about the Curie temperature of the optical fiber.

21. The method according to claim 20, wherein the optical fiber is subjected to the hot zone when the optical fiber is between two electrodes having opposite voltage potentials.

22. The optical fiber according to claim 1, wherein the oxide glass is a silicate glass.

23. The optical fiber according to claim 1, wherein the primary core material is a semiconductor.

24. The optical fiber according to claim 23, wherein the semiconductor is a Group IV semiconductor, a Group III-V semiconductor, or a Group II-VI semiconductor.

25. The optical fiber according to claim 1, wherein the core comprises silicon.

26. The optical fiber according to claim 1, the core further comprising a dopant.

27. The optical fiber according to claim 26, wherein the dopant is a Group III element, a Group IV element, a rare earth element, or a transition metal.

28. The optical fiber according to claim 1, further comprising a second clad.

29. The optical fiber according to claim 1, further comprising a conductive material.

30. The optical fiber according to claim 29, wherein the optical fiber defines an axial length, the conductive material being disposed longitudinally along the axial length of the optical fiber.

31. The optical fiber according to claim 29, wherein the optical fiber defines a central axis, the conductive material being disposed helically about the central axis of the optical fiber.

* * * * *